(12) United States Patent
Cimpeanu et al.

(10) Patent No.: US 9,315,943 B2
(45) Date of Patent: Apr. 19, 2016

(54) FINELY DIVIDED, STARCH-CONTAINING POLYMER DISPERSIONS, PROCESSES FOR THEIR PREPARATION AND USE AS SIZES IN PAPERMAKING

(71) Applicant: BASF SE, Ludwigshafen (DE)

(72) Inventors: Carmen-Elena Cimpeanu, Ludwigshafen (DE); Holger Kern, Kirchardt (DE); Petra Arnold, Birkenau (DE); Christoph Hamers, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/350,467

(22) PCT Filed: Oct. 11, 2012

(86) PCT No.: PCT/EP2012/070188
§ 371 (c)(1),
(2) Date: Apr. 8, 2014

(87) PCT Pub. No.: WO2013/053840
PCT Pub. Date: Apr. 18, 2013

(65) Prior Publication Data
US 2014/0275415 A1  Sep. 18, 2014

Related U.S. Application Data

(60) Provisional application No. 61/547,081, filed on Oct. 14, 2011.

(30) Foreign Application Priority Data

Oct. 14, 2011 (EP) .................................... 11185268

(51) Int. Cl.
| | | |
|---|---|---|
| C08L 25/14 | (2006.01) |
| C08L 3/00 | (2006.01) |
| C08K 3/10 | (2006.01) |
| D21H 21/16 | (2006.01) |
| C08F 212/08 | (2006.01) |
| C08F 2/24 | (2006.01) |
| D21H 17/28 | (2006.01) |
| D21H 17/34 | (2006.01) |
| D21H 19/20 | (2006.01) |
| C08F 2/26 | (2006.01) |
| C08F 251/00 | (2006.01) |
| C08F 220/18 | (2006.01) |

(52) U.S. Cl.
CPC *D21H 21/16* (2013.01); *C08F 2/24* (2013.01); *C08F 2/26* (2013.01); *C08F 212/08* (2013.01); *C08F 220/18* (2013.01); *C08F 251/00* (2013.01); *D21H 17/28* (2013.01); *D21H 17/34* (2013.01); *D21H 19/20* (2013.01)

(58) Field of Classification Search
None
See application file for complete search history.

(56) References Cited

U.S. PATENT DOCUMENTS

| | | | |
|---|---|---|---|
| 5,116,924 A | 5/1992 | Bung et al. | |
| 5,169,886 A | 12/1992 | Bung et al. | |
| 6,835,767 B2 | 12/2004 | Kühn et al. | |
| 8,685,207 B2 * | 4/2014 | Song et al. | 162/168.1 |
| 2009/0139675 A1 | 6/2009 | Stein et al. | |
| 2010/0236736 A1 * | 9/2010 | Brockmeyer et al. | 162/168.2 |
| 2012/0180970 A1 | 7/2012 | Song et al. | |

FOREIGN PATENT DOCUMENTS

| | | |
|---|---|---|
| CN | 101213215 A | 6/2006 |
| CN | 101851877 A | 10/2010 |
| EP | 0 257 412 A1 | 3/1988 |
| EP | 0 276 770 B1 | 8/1988 |
| JP | 2000-239992 | 9/2000 |

(Continued)

OTHER PUBLICATIONS

International Preliminary Report on Patentability and Written Opinion issued Apr. 24, 2014 in PCT/EP2012/070188 filed Oct. 11, 2012.
International Search Report and Written Opinion issued Jun. 17, 2013 in PCT/EP2012/070188 filed Oct. 11, 2012.
U.S. Appl. No. 14/356,530, filed May 6, 2014, Seyffer, et al.

(Continued)

*Primary Examiner* — Vu A Nguyen
(74) *Attorney, Agent, or Firm* — Oblon, McClelland, Maier & Neustadt, L.L.P.

(57) ABSTRACT

A finely divided, starch-containing polymer dispersion which is obtainable by free radical emulsion polymerization of ethylenically unsaturated monomers in the presence of at least one redox initiator and starch, wherein (a) from 0 to less than 40% by weight of at least one optionally substituted styrene, (b) from greater than 60 to 100% by weight of at least one $C_1$-$C_{12}$-alkyl acrylate and/or $C_1$-$C_{12}$-alkyl methacrylate, (c) from 0 to 10% by weight of at least one other ethylenically unsaturated copolymerizable monomer, are used as the ethylenically unsaturated monomers, the sum (a)+(b)+(c) being 100% and being based on the active monomer content and (d) from 15 to 40% by weight of at least one degraded starch which has a molar mass $M_w$ of from 1000 to 65 000 g/mol, based on the total weight of solids content of components (a)+(b)+(c)+(d), are used as the starch, and the polymerization being carried out in the presence of at least 0.01% by weight, based on the monomers used, of at least one terpene containing chain-transfer agent, and in which the polymer dispersion optionally comprises an aluminum compound. The use of the finely divided, starch-containing polymer dispersions as sizes for paper, board and cardboard is also claimed.

11 Claims, No Drawings

(56) References Cited

FOREIGN PATENT DOCUMENTS

| WO | WO 99/42490 A1 | 8/1999 |
| WO | WO 02/14393 A1 | 2/2002 |
| WO | WO 2007/000419 A1 | 1/2007 |
| WO | WO 2007/000420 A1 | 1/2007 |
| WO | WO 2011/039185 A2 | 4/2011 |

OTHER PUBLICATIONS

U.S. Appl. No. 14/375,937, filed Jul. 31, 2014, Al-Hellani, et al.
U.S. Appl. No. 14/360,803, filed May 27, 2014, Seyffer, et al.
Chinese Office Action issued on Feb. 27, 2015, in corresponding Chinese Patent Application No. 201280050471.2 including English Translation of the Chinese Office Action and the pending claims, 16 pp.

* cited by examiner

FINELY DIVIDED, STARCH-CONTAINING POLYMER DISPERSIONS, PROCESSES FOR THEIR PREPARATION AND USE AS SIZES IN PAPERMAKING

The invention relates to finely divided, starch-containing polymer dispersions which are obtainable by emulsion polymerization of ethylenically unsaturated monomers in the presence of at least one redox initiator, starch and a chain-transfer agent, processes for the preparation of the dispersions and their use as sizes and coating materials for paper.

EP 0 276 770 B1 and EP 0 257 412 B2 disclose sizes based on finely divided, aqueous dispersions which are obtainable by copolymerization of ethylenically unsaturated monomers, such as acrylonitrile and (meth)acrylates and optionally up to 10% by weight of other monomers, such as styrene, by an emulsion polymerization in the presence of initiators comprising peroxide groups, in particular of redox initiators, and degraded starch. The use of chain-transfer agents, such as terpenes, is not disclosed in any of the documents.

WO 99/42490 A1 likewise discloses aqueous, finely divided polymer dispersions which are used for the surface sizing of paper, board and cardboard. The dispersions are obtainable by free radical emulsion polymerization of ethylenically unsaturated monomers in the presence of degraded starch having a number average molecular weight $M_n$ of from 500 to 10 000. The monomers consist of (i) at least one optionally substituted styrene, (ii) at least one $C_1$-$C_4$-alkyl (meth)acrylate and (iii) optionally up to 10% by weight of other ethylenically unsaturated monomers. The polymerization is effected in the presence of a graft-linking, water-soluble redox system. The use of chain-transfer agents from the group consisting of the mercaptans is disclosed for adjusting the molecular weight.

WO 2002/14393 A1 discloses a process for the preparation of polymer dispersions which are used as sizes and coating materials. These polymer dispersions are obtainable by emulsion copolymerization of a monomer mixture comprising at least one (meth)acrylate of monohydric, saturated $C_3$-$C_8$-alcohols an at least one further ethylenically unsaturated monomer in the presence of a starch or of a starch derivative and of an initiator comprising peroxide groups. The emulsion polymerization is distinguished in that both the monomers and the initiator are metered in continuously, a first amount of initiator being metered in within a first feed period of from 5 to 60 minutes and a second amount of initiator which is smaller than the first amount of initiator being metered in within a second feed period of from 5 to 180 minutes. The use of chain-transfer agents is not disclosed.

Finely divided, starch-containing polymer dispersions as sizes for paper, board and cardboard are also disclosed in WO 2007/000419 A1. These are obtainable by emulsion polymerization, in an aqueous medium, using redox initiators, of ethylenically unsaturated monomers comprising (i) at least one optionally substituted styrene, methyl methacrylate, acrylonitrile and/or methacrylonitrile, (ii) at least one $C_1$-$C_{12}$-alkyl(meth)acrylate and at least (iii) one ethylenically unsaturated copolymerizable monomer in the presence of a degraded, cationic starch which has a molar mass $M_w$ of from 1000 to 65 000 g/mol. The disclosure comprises a multiplicity of chain-transfer agents but the example according to the invention is carried out without a chain transfer agent.

WO 2007/000420 A1 likewise discloses finely divided, aqueous, starch-containing polymer dispersions as sizes for paper, board and cardboard, which are obtainable by free radical emulsion polymerization of (i) at least one optionally substituted styrene, methyl methacrylate, acrylonitrile and/or methacrylonitrile, (ii) at least one $C_1$-$C_4$-alkyl methacrylate, (iii) at least one $C_5$-$C_{22}$-alkyl(meth)acrylate and (iv) optionally at least one other ethylenically copolymerizable monomer and (v) a degraded starch having a molar mass $M_w$ of from 1000 to 65 000 in the presence of a chain-transfer agent. The description discloses a multiplicity of potential chain-transfer agents but tert-dodecyl merpatan is the preferred chain-transfer agent, which is also used in all examples.

WO 2011/039185 discloses a finely divided, starch containing polymer dispersions which are obtained by free radical emulsion polymerisation of ethylenically unsaturated monomers in the presence of at least one redox initiator and starch. The polymers are formed by polymerisation of at least one optionally substituted styrene, at least one $C_1$-$C_{12}$-alkyl acrylate or methacrylate and optionally other ethylenically unsaturated monomer. The polymerisation employs at least one terpene-containing chain-transfer agent.

There is a continuous need in the paper industry for novel, efficient engine sizes (also known as internal sizes) and surface sizes for the production of paper, board and cardboard.

Thus according to the present invention we provide a finely divided, starch-containing polymer dispersion which is obtainable by free radical emulsion polymerization of ethylenically unsaturated monomers in the presence of at least one redox initiator and starch, wherein (a) from 0 to less than 40% by weight of at least one optionally substituted styrene,
(b) from greater than 60 to 100% by weight of at least one $C_1$-$C_{12}$-alkyl acrylate and/or $C_1$-$C_{12}$-alkyl methacrylate,
(c) from 0 to 10% by weight of at least one other ethylenically unsaturated copolymerizable monomer, are used as the ethylenically unsaturated monomers, the sum (a)+(b)+(c) being 100% and being based on the active monomer content and (d) from 15 to 40% by weight of at least one degraded starch which has a molar mass $M_w$ of from 1000 to 65 000 g/mol, based on the total weight of solids content of components (a)+(b)+(c)+(d), is used as the starch,
and the polymerization being carried out in the presence of at least 0.01% by weight, based on the monomers used, of at least one chain-transfer agent,
and in which the polymer dispersion optionally comprises an aluminium compound.

The finely divided, starch-containing polymer dispersions according to the invention are distinguished by a significantly increased sizing effect with respect to the prior art in the production of paper, board and cardboard.

Monomers of group (a) are optionally substituted styrenes. This group includes styrene and substituted styrenes, such as, for example, α-methylstyrene, styrenes halogenated on the ring, such as chlorostyrene, or $C_1$-$C_4$-substituted styrenes, such as vinyltoluene. Of course, mixtures of optionally substituted styrenes can also be used. A preferably used monomer of this group is styrene, which is preferably used alone from this group.

The monomers of group (a) are present in an amount of from 0 to less than 40% by weight, preferably from 1 to below 40% by weight, in the ethylenically unsaturated monomer mixture comprising (a), (b), and (c). More preferably monomers of group (a) may be present in an amount of at least 5% by weight, often at least 10%, typically at least 15%, and frequently at least 20% or higher, for instance at least 25% or more. Often the monomers of group (a) may be present in an amount of no more than 39% by weight and typically no more than 37% or 38%. Frequently the monomers of this group may be present in an amount of up to 35%. More preferably these monomers may be present in an amount of up to 30%, and in some cases up to 25%. These amounts may be useful in combination with any of the aforementioned ranges. Typical ranges include 15 to 35% by weight; and 20 to 35%.

Suitable monomers of group (b) are all esters of acrylic acid and of methacrylic acid which are derived from monohydric $C_1$-$C_{12}$-alcohols, such as methyl acrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, sec-butyl acrylate, sec-butyl methacrylate, n-pentyl acrylate, n-pentyl methacrylate, neopentyl acrylate, neopentyl methacrylate, cyclohexyl acrylate, cyclohexyl methacrylate, 2-hexyl acrylate, 2-hexyl methacrylate, 2-ethylhexyl acrylate, 2-ethylhexyl methacrylate, n-octyl acrylate, n-octyl methacrylate, isooctyl acrylate, isooctyl methacrylate, decyl acrylate and decyl methacrylate, dodecyl acrylate, dodecyl methacrylate, 2-propylheptyl acrylate and 2-propylheptyl methacrylate. Preferably used monomers of this group are esters of acrylic acid and methacrylic acid with $C_1$-$C_8$-alcohols, such as methyl acrylate, ethyl acrylate, n-propyl acrylate, isopropyl acrylate, n-butyl acrylate, sec-butyl acrylate, isobutyl acrylate, tert-butyl acrylate, cyclohexyl acrylate, 2-ethylhexyl acrylate and 2-ethylhexyl methacrylate. The esters of acrylic acid with $C_1$-$C_4$-alcohols, such as n-butyl acrylate, sec-butyl acrylate, isobutyl acrylate and tert-butyl acrylate are particularly preferred. Of these tert-butyl acrylate is an example of an especially preferred monomer of this group.

According to the invention, at least one $C_1$-$C_{12}$-alkyl acrylate and/or $C_1$-$C_{12}$-alkyl methacrylate is used as a monomer of group (b), for example two or more of the abovementioned esters in any desired mixtures with one another. Preferably only one monomer from the group (b) is used as a monomer of the group and particularly preferably a monomer from the group consisting of the esters of acrylic acid with $C_1$-$C_4$-alcohols.

The monomers of group (b) are present in an amount of from greater than 60 to 100% by weight in the ethylenically unsaturated monomer mixture comprising (a), (b), and (c), preferably in amounts of at least 61% and typically at least 62% or at least 63%. Frequently the monomers of this group may be present in an amount of at least 65%. Monomers of group (b) preferably may be present in an amount up to 99% by weight (for instance from 61% to 99%), suitably up to 95% and typically up to 85% or 90%. Often monomers of this category may be present in an amount up to 75% or 80%. These amounts may be useful in combination with any of the aforementioned ranges. Typical ranges for instance include 65 to 80%; and 65 to 75%.

In order to modify the polymers, the polymerization can optionally be carried out in the presence of at least one further monomer (c). Suitable monomers (c) are in principle all monomers which differ from the monomers (a) and (b). Examples of such monomers are vinyl acetate, vinyl propionate, hydroxyethyl acrylate, hydroxyethyl methacrylate, N-vinylformamide, acrylamide, methacrylamide, N-vinylpyrrolidone, N-vinylimidazole, N-vinylcaprolactam, acrylic acid, methacrylic acid, acrylamidomethylpropanesulfonic acid, styrenesulfonic acid, vinylsulfonic acid and salts of the monomers comprising acid groups. The acidic monomers can be used in partly or completely neutralized form. Neutralizing agents used are, for example, sodium hydroxide solution, potassium hydroxide solution, sodium carbonate, sodium bicarbonate, calcium hydroxide and ammonia.

Further examples of monomers (c) are dialkylaminoalkyl (meth)acrylates and dialkylaminoalkyl(meth)acrylamides, such as dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, dimethylaminoethylacrylamide, dimethylaminoethylmethacrylamide, dimethylaminopropylacrylamide and dimethylaminopropylmethacrylamide. The basic monomers can be used in the form of the free bases, as salts with the organic acids or mineral acids or in quaternized form in the polymerization.

In addition, vinyl esters of linear or branched $C_1$-$C_{30}$-carboxylic acids are suitable as monomers of group (c). Such carboxylic acids are saturated and straight-chain, such as formic acid, acetic acid, propionic acid, butyric acid, valeric acid, caproic acid (hexanoic acid), heptanoic acid, caprylic acid (octanoic acid), pelargonic acid, capric acid (decanoic acid), undecanoic acid, lauric acid (dodecanoic acid), tridecanoic acid, myristic acid (tetradecanoic acid), pentadecanoic acid, palmitic acid, margaric acid, stearic acid, nonadecanoic acid, arachidic acid, behenic acid, lignoceric acid (tetracosanoic acid), cerotic acid, melissic acid (triacontanoic acid). According to the invention, saturated, branched carboxylic acids, such as, isobutyric acid, isovaleric acid (3-methylbutyric acid) and tuberculostearic acid, and strongly branched saturated carboxylic acids are also suitable. The latter are known by the term versatic acids, such as, for example, pivalic acid, neohexanoic acid, neoheptanoic acid, neooctanoic acid, neononanoic acid and neodecanoic acid. Suitable vinyl esters of linear or branched $C_1$-$C_{30}$-carboxylic acids are, for example, vinyl laurate, vinyl stearate, vinyl propionate, vinyl versatate, vinyl acetate, vinyl propylheptanoate, vinyl neodecanoate (VeoVA® 10 from Hexion Specialty Chemicals), vinyl neononanoate (VeoVa® 9 from Hexion Specialty Chemicals) and vinyl pelargonate.

Of course, any desired mixtures of said monomers (c) can be used.

The monomers of group (c) are present in an amount of from 0 to 10% by weight in the ethylenically unsaturated monomer mixture comprising the components (a), (b), and (c). If they are used for modifying the polymers, the preferably used amounts are from 0.1 to 5% by weight, based on the ethylenically unsaturated monomer mixture comprising the components (a), (b), and (c).

The polymerization of the monomers is effected in the presence of a degraded starch as component (d), which has a molar mass $M_w$ of from 1000 to 65 000 g/mol. The average molecular weights $M_w$ of the degraded starches can easily be determined by methods known to the person skilled in the art, for example by means of gel permeation chromatography with the use of a multiangle light scattering detector.

In order to obtain such a starch, it is possible to start from all starch types, for example from starch from potatoes, corn, wheat, rice, tapioca, peas, sorghum or wax starches, which have a content of amylopectin of >80, preferably >95, % by weight, such as waxy corn starch and waxy potato starch. The starches can be anionically and/or cationically modified, esterified, etherified and/or crosslinked. Anionic starches are preferred.

If the molecular weight $M_w$ of the starches is not already in the range from 1000 to 65 000 g/mol, they are subjected to an increase in molecular weight before the beginning of the polymerization or in a separate step. A procedure in which a starch is enzymatically and/or oxidatively degraded before the beginning of the polymerization is preferred. The molar mass $M_w$ of the degraded starch is preferably in the range from 2500 to 35 000 g/mol.

In the case of cationized starches, these are prepared, for example, by reacting native starch with at least one quaternizing agent, such as 2,3-epoxypropyltrimethylammonium chloride. The cationized starches comprise quaternary ammonium groups.

In the case of anionic starches, these are obtained, for example, by oxidative reaction of the native starch with a suitable oxidizing agent, such as sodium hypochlorite or periodate.

The proportion of cationoic or anionic groups in the substituted starch is stated with the aid of the degree of substitution (DS). It is, for example, from 0.005 to 1.0, preferably from 0.01 to 0.4.

All starches can be used. The degradation of the starches is preferably effected before the polymerization of the monomers but can also be carried out during the polymerization of the monomers. It can be carried out oxidatively, thermally, acidolytically or enzymatically. Preferably, the starch degradation is effected enzymatically and/or oxidatively directly before the beginning of the emulsion polymerization in the apparatus in which the polymerization is to be carried out or in a separate step. It is possible to use a single degraded starch or mixtures of two or more degraded starches in the polymerization.

The starch is present in the reaction mixture comprising the components (a), (b), (c) and (d) in an amount of from 15 to 40% by weight based on the total weight of solids content, preferably from 25 to 35% by weight.

The finely divided starch-containing polymer dispersions according to the invention are obtainable by carrying out the polymerization in the presence of at least 0.01% by weight, based on the monomers used, of at least one terpene-containing chain-transfer agent otherwise known as polymerisation regulators.

The chain transfer agents may be terpene-containing chain-transfer agents are understood as meaning those hydrocarbons which are composed of isoprene units [$H_2C=C(CH_3)-CH=CH_2$] and can consequently be derived from the isoprene rule. Terpenes are divided into monoterpenes ($C_{10}$), sesquiterpenes ($C_{15}$), diterpenes ($C_{20}$), sesterterpenes ($C_{25}$), triterpenes ($C_{30}$) and tetraterpenes ($C_{40}$) and polyterpenes ($>C_{40}$), substantially into acyclic, monocyclic, bicyclic and tricyclic terpenes. Terpenes are known to a person skilled in the art, for example from Römpp Chemie Lexikon, 9th extended and revised edition, 1989-1992, Georg Thieme Verlag Stuttgart.

In the narrower sense, terpenes are understood as meaning hydrocarbons having a $C_{10}H_{16}$ skeleton, and the hydrogenation and dehydrogenation derivatives thereof and the alcohols, ketones, aldehydes and esters derived therefrom.

According to the invention, monocyclic monoterpenes are preferably used, particularly preferably diunsaturated monocyclic monoterpenes (so-called p-menthadienes). Examples of diunsaturated monocyclic monoterpenes are α-, β- and γ-terpinene, terpinolene, (+)-(S)-α-phellandrene, (−)-(S)-α-phellandrene and limonene. α-terpinene and terpinolene are preferred and terpinolene is particularly preferred.

Of course, mixtures of said terpene-containing chain-transfer agents can also be used, but preferably only one terpene-containing chain-transfer agent is used, particularly preferably only terpinolene is used.

The terpene-containing chain-transfer agents are used in the polymerization in an amount of at least 0.01% by weight, based on the monomers. The amounts depend substantially on the efficiency of the chain-transfer agent or chain-transfer agents used in each case. They are usually in the range from 0.01 to 10% by weight, preferably from 0.05 to 5.0% by weight, based on the monomers (a), (b) and (c).

In order to initiate the polymerization, a redox initiator is used according to the invention. Said redox initiators are preferably graft-linking, water-soluble redox systems, for example comprising hydrogen peroxide and a heavy metal salt or comprising hydrogen peroxide and sulfur dioxide or comprising hydrogen peroxide and sodium metabisulfite. Further suitable redox systems are combinations of tert-butyl hydroperoxide/sulfur dioxide, sodium or potassium persulfate/sodium bisulfite, ammonium persulfate/sodium bisulfite or ammonium persulfate/iron(II) sulfate. Preferably, hydrogen peroxide is used in combination with a heavy metal salt, such as iron(II) sulfate. Frequently, the redox system additionally comprises a further reducing agent, such ascorbic acid, sodium formaldehyde sulfoxylate, sodium disulfite or sodium dithionite. Since the polymerization of the monomers is effected in the presence of starch and since starch likewise acts as reducing agent, the concomitant use of further reducing agents is generally dispensed with. The redox initiators are used, for example, in an amount of from 0.05 to 10% by weight, preferably from 0.1 to 5% by weight, based on the monomers.

In some circumstances it would be desirable to provide starch based sizing compositions which exhibit improved storage stability. Unexpectedly, the inventors have found that by the inclusion of at least one aluminium compound the storage stability can be improved without any deleterious effects on sizing performance. Furthermore, it has also been found that in some circumstances the starch-based sizing compositions of the present invention which additionally contain at least one aluminium compound may exhibit further improved sizing effects.

Thus the polymer dispersions of the present invention desirably may also contain at least one aluminium compound. This aluminium compound desirably will be included in the polymer dispersion that has been formed.

Typically the aluminium compound may be any suitable compound that does not adversely change the properties of the polymer dispersion. Generally the aluminium compound may be a water-soluble compound. Suitable aluminium compounds include aluminium sulphate, aluminium chloride, aluminium phosphate, aluminium nitrate, aluminium hydroxide, aluminium oxide and poly aluminium chloride. Preferred aluminium compounds include aluminium sulphate and poly aluminium chloride.

Typically the aluminium compound may be included in an amount of at least 0.1% by weight based on weight of total solids content of dispersion. The amount may be as much as 60 or 70% by weight but generally will be up to 50%. Other suitable ranges include at least 1% or at least 2% or at least 5% or for instance up to 30% or up to 40%.

Accordingly, polymer dispersions which are obtainable by free radical emulsion polymerization of ethylenically unsaturated monomers in the presence of at least one redox initiator and starch are preferred,
 (a) from 0 to less than 40% by weight of at least one optionally substituted styrene,
 (b) from greater than 60 to 100% by weight of at least one $C_1$-$C_{12}$-alkyl acrylate and/or $C_1$-$C_{12}$-alkyl methacrylate,
 (c) from 0 to 5% by weight of at least one other ethylenically unsaturated copolymerizable monomer are used as the ethylenically unsaturated monomers, the sum (a)+(b)+(c) being 100% and being based on the active monomer content and (d) from 25 to 35% by weight of at least one degraded starch which has a molar mass $M_w$ of from 1000 to 65 000 g/mol, based on the total weight of solids content of components (a)+(b)+(c)+(d), are used as the starch,
and the polymerization being carried out in the presence of at least 0.01% by weight, based on the monomers used, of at least one terpene-containing chain-transfer agent,
and in which the polymer dispersion optionally comprises 0.1 to 50% of an aluminium compound based on the total weight of solids content of the polymer dispersion.

Particularly preferred finely divided, starch-containing polymer dispersion are those which (a) from 15 to 35% by weight of at least one optionally substituted styrene,
(b) from 65 to 80% by weight of a $C_1$-$C_{12}$-alkyl acrylate or $C_1$-$C_{12}$-alkyl methacrylate,
(c) from 0 to 5% by weight of at least one other ethylenically unsaturated copolymerizable monomer are used as the ethylenically unsaturated monomers, the sum (a)+(b)+(c) being 100% and being based on the active monomer content and (d) from 25 to 35% by weight of at least one degraded starch which has a molar mass $M_w$ of from 2500 to 35 000 g/mol, based on the total weight of solids content of components (a)+(b)+(c)+(d), are used as the starch,
and the polymerization being carried out in the presence of at least 0.01% by weight, based on the monomers used, of at least one terpene-containing chain-transfer agent,
and in which the polymer dispersion optionally comprises 0.1 to 50% of an aluminium compound based on the total weight of the solids content of the polymer dispersion.

In particular, those finely divided, starch-containing polymer dispersions are preferred in which (a) from 20 to 35% by weight of at least one optionally substituted styrene,
(b) from 65 to 75% by weight of a $C_1$-$C_{12}$-alkyl acrylate,
(c) from 0 to 5% by weight of at least one other ethylenically unsaturated copolymerizable monomer are used as the ethylenically unsaturated monomers, the sum (a)+(b)+(c) being 100% and being based on the active monomer content and (d) from 25 to 35% by weight of a degraded anionic starch which has a molar mass $M_w$ of from 2500 to 35 000 g/mol, based on the total weight of solids content of components (a)+(b)+(c)+(d), are used as the starch,
and the polymerization being carried out in the presence of at least 0.01% by weight, based on the monomers used, of at least one terpene-containing chain-transfer agent,
and in which the polymer dispersion optionally comprises 0.1 to 50% of an aluminium compound based on the total weight of the solids content of the polymer dispersion.

It is especially preferred that in the finely divided, starch-containing polymer dispersion (a) from 20 to 35% by weight of at least one optionally substituted styrene,
(b) from 65 to 75% by weight of a $C_1$-$C_4$-alkyl acrylate,
(c) from 0 to 5% by weight of at least one other ethylenically unsaturated copolymerizable monomer are used as the ethylenically unsaturated monomers, the sum (a)+(b)+(c) being 100% and being based on the active monomer content and (d) from 25 to 35% by weight of a degraded anionic starch which has a molar mass $M_w$ of from 2500 to 35 000 g/mol, based on the total weight of solids content of components (a)+(b)+(c)+(d), are used as the starch,
and the polymerization being carried out in the presence of at least 0.01% by weight, based on the monomers used, of at least one terpene-containing chain-transfer agent,
and in which the polymer dispersion optionally comprises 0.1 to 50% of an aluminium compound based on the total weight of the solids content of the polymer dispersion.

The invention also relates to a process for the preparation of the finely divided, starch-containing polymer dispersions according to the invention which are obtainable by emulsion polymerization.

Such a process is distinguished in that (a) from 0 to less than 40% by weight of at least one optionally substituted styrene,
(b) from greater than 60 to 100% by weight of at least one $C_1$-$C_{12}$-alkyl acrylate and/or $C_1$-$C_{12}$-alkyl methacrylate,
(c) from 0 to 10% by weight of at least one other ethylenically unsaturated copolymerizable monomer, are used as the ethylenically unsaturated monomers, the sum (a)+(b)+(c) being 100% and being based on the active monomer content and (d) from 15 to 40% by weight of at least one degraded starch which has a molar mass $M_w$ of from 1000 to 65 000 g/mol, based on the total weight of solids content of components (a)+(b)+(c)+(d), are polymerized in the presence of a redox initiator in an aqueous medium and the polymerization is carried out in the presence of at least 0.01% by weight, based on the monomers used, of at least one terpene-containing chain-transfer agent, and in which the polymer dispersion optionally comprises an aluminium compound.

The emulsion polymerization of the monomers (a) to (c) is effected in an aqueous medium in the presence of a starch (d) having a molar mass $M_w$ of from 1000 to 65 000 g/mol. The monomers can be polymerized by the emulsion polymerization method, either in the feed procedure or in the batch procedure. Preferably, an aqueous solution of the degraded starch and of a heavy metal salt is initially taken and the monomers are added either separately or as a mixture and, separately therefrom, the oxidizing part of the redox initiator, preferably hydrogen peroxide, is added continuously or batchwise. A gradient procedure, which is disclosed in WO 2002/14393 A1, can also be used for the preparation of the starch-containing polymer dispersions.

The addition can be effected uniformly or nonuniformly, i.e. with changing metering rate, over the metering period.

The polymerization is usually carried out in the absence of oxygen, preferably in an inert gas atmosphere, e.g. under nitrogen. During the polymerization, thorough mixing of the components should be ensured. Thus, the reaction mixture is preferably stirred during the entire duration of the polymerization and of any subsequent postpolymerization.

The polymerization is usually carried out at temperatures of from 30 to 110° C., preferably from 50 to 100° C. Use of a pressure-resistant reactor or carrying out a continuous polymerization in a stirred tank cascade or flow tube is also possible.

For enhancing the dispersing effect, customary ionic, nonionic or amphoteric emulsifiers may be added to the polymerization batch. Customary emulsifiers are only optionally used. The amounts used are from 0 to 3% by weight and are preferably in the range from 0.02 to 2% by weight, based on the sum of the monomers (a), (b) and (c) used. Customary emulsifiers are described in detail in the literature, cf. for example M. Ash, I. Ash, Handbook of Industrial Surfactants, third edition, Synapse Information Resources Inc. Examples of customary emulsifiers are the reaction products of long-chain monohydric alcohols ($C_{10}$- to $C_{22}$-alkanols) with 4 to 50 mol of ethylene oxide and/or propylene oxide per mole of alcohol or ethoxylated phenols, or alkoxylated alcohols esterified with sulfuric acid which are generally used in a form neutralized with alkali. Further customary emulsifiers are, for example, sodium alkanesulfonates, sodium alkylsulfates, sodium dodecylbenzenesulfonate, sulfosuccinic esters, quaternary alkylammonium salts, alkylbenzylammonium salts, such as dimethyl-$C_{12}$- to $C_{18}$-alkylbenzylammonium chlorides, primary, secondary and tertiary fatty amine salts, quaternary amidoamine compounds, alkylpyridinium salts, alkylimidazolinium salts and alkyloxazolinium salts.

During the emulsion polymerization, either the monomers can be metered directly into the initially taken mixture or they can be added in the form of an aqueous emulsion or mini emulsion to the polymerization batch. For this purpose, the monomers are emulsified in water with the use of the above-mentioned customary emulsifiers.

The polymerization is carried out at a pH of from 2 to 9, preferably in the weakly acidic range at a pH from 3 to 5.5. The pH can be adjusted to the desired value before or during the polymerization with customary acids, such as hydrochloric acid, sulfuric acid or acetic acid, or with bases, such as sodium hydroxide solution, potassium hydroxide solution, ammonia, ammonium carbonate, etc. The dispersion is preferably adjusted to a pH of from 3 to 5.5 after the end of the polymerization.

In order to remove the residual monomers as substantially as possible from the starch-containing polymer dispersion, a postpolymerization is expediently carried out. For this purpose, an initiator from the group consisting of hydrogen peroxide, peroxides, hydroperoxides and/or azo initiators is added to the polymer dispersion after the end of the main polymerization. The combination of initiators with suitable reducing agents, such as, for example, ascorbic acid or sodium bisulfite, is likewise possible. Oil-soluble initiators which are sparingly soluble in water are preferably used, for example customary organic peroxides, such as dibenzoyl peroxide, di-tert-butyl peroxide, tert-butyl hydroperoxide, cumyl hydroperoxide or biscyclohexyl peroxodicarbonate.

For the postpolymerization, the reaction mixture is heated, for example, to a temperature which corresponds to the temperature at which the main polymerization was carried out or which is up to 20° C., preferably up to 10° C., higher. The main polymerization is complete when the polymerization initiator has been consumed or the monomer conversion is, for example, at least 98%, preferably at least 99.5%. Tert-butyl hydroperoxide is preferably used for the postpolymerization. The postpolymerization is carried out, for example, in a temperature range from 35 to 100° C., in general from 45 to 95° C.

After the end of the polymerization, a complexing agent for heavy metal ions can be added to the polymer dispersion in an amount such that all heavy metal ions are bound as a complex.

The starch-containing polymer dispersions comprise dispersed particles having a mean particle size of from 20 to 500 nm, preferably from 50 to 250 nm. The mean particle size can be determined by means of methods known to the person skilled in the art, such as, for example, laser correlation spectroscopy, ultracentrifuging or HDF (hydrodynamic fractionation). A further measure of the particle size of the dispersed polymer particles is the LT value. For determining the LT value (light transmittance), the polymer dispersion to be investigated in each case is measured in 0.1% strength by weight aqueous dilution in a cell having an edge length of 2.5 cm using light of 600 nm wavelength and is compared with the corresponding transmittance of water under the same measuring conditions. The transmittance of water is specified as 100%. The more finely divided the dispersion, the higher is the LT value which is measured by the method described above. From the measured values, it is possible to calculate the mean particle size, cf. B. Verner, M. Barta, B. Sedlacek, Tables of Scattering Functions for Spherical Particles, Prague, 1976, Edice Marco, Rada D-DATA, SVAZEK D-1.

The solids content of the starch-containing polymer dispersion is, for example, from 5 to 50% by weight and is preferably in the range from 15 to 40% by weight.

The finely divided, starch-containing polymer dispersions described above are used as sizes for paper, board and cardboard. They can be used both as surface sizers and as engine sizers in the amounts customary in each case. The use as surface size is preferred. Here, the dispersions according to the invention can be processed by all methods suitable in the case of surface sizing. The polymer dispersions can be applied to the surface of the paper to be sized, for example, by means of a size press, film press or a gate-roll applicator. For use, the dispersion is usually added to the size press liquor in an amount of from 0.05 to 3% by weight, based on solid substance, and depends on the desired degree of sizing of the papers to be finished. Furthermore, the size press liquor may comprise further substances, such as, for example, starch, pigments, dyes, optical brighteners, biocides, paper strength agents, fixing agents, antifoams, retention aids and/or drainage aids. The amounts of polymer which are applied to the surface of paper products are, for example, from 0.005 to 1.0 $g/m^2$, preferably from 0.01 to 0.5 $g/m^2$. Compared with the known sizes, the sizes according to the invention have the advantage that they give a better sizing effect even when applied in small amounts, especially on uncoated wood-free papers.

The invention is explained in more detail with reference to the following, non-limiting examples.

EXAMPLES

The percentage data in the examples are percent by weight, unless evident otherwise from the context.

LT values were determined in 0.1% strength aqueous solution of the dispersion to be determined, using a DR/2010 apparatus from Hach at a wavelength of 600 nm. The particle sizes were determined by means of a high performance particle sizer (HPPS) from Malvern using an He—Ne laser (633 nm) at a scattering angle of 173°.

Example 1

Dispersion 1

In a ground-joint 2 l flask equipped with stirrer and internal temperature measurement, 75.00 g of oxidative degraded starch (80% by weight) with a $COO^-$— substitution grade of 0.03-0.04 and a K-value of 34 (determined after DIN 53726) (Amylex® 15 from Co. Südstärke) and 370.00 g demineralised water were added to the charge and heated up to 80° C. under stirring within 1 h. Then 1.40 g (1% by weight) solution of enzyme Temamyl 120 L were added and the mixture was stirred for 20 min. Afterwards 4.00 g (10% by weight) iron(II) sulfate heptahydrate solution in water was added, whereby the enzymatic degradation was stopped. Subsequently the feed of 70.00 g (5% by weight) hydrogen peroxide solution was started and fed over 165 min. Concomitantly a mixture of 42.00 g of Styrene, 98.00 g of tert-Butyl acrylate, 1.00 g of Terpinolene (90% by weight), 0.50 g (40% by weight) of Emulsifier K30 (Na—$C_{14}$-$C_{15}$-alkylsulfonate, Emulgator® K30 from Bayer AG) and 110.00 g demineralised water was also fed over 120 min. After the starting of the both feeds the reaction temperature has being risen up to 85° C. within 5 min. At the end of the monomer feed 15.00 g demineralised water were added. 15 Min after the completion of hydrogen peroxide feed, 2.00 g (10% by weight) of tert.-Butylhydroperoxide and 1.00 g of a 10% by weight ascorbic acid solution were added and stirred in for 15 min, followed by a new addition of 2.00 g (10% by weight) of tert.-Butylhydroperoxide. The batch was further stirred for 30 min and then cooled down to the room temperature. A finely divided polymer dispersion having a solids content of 26% by weight, a LT value (0.1%) of 83.4% and a particle size of 76 nm was obtained.

Comparative Example 1

Dispersion 2

In a ground-joint 2 l flask equipped with stirrer and internal temperature measurement, 75.00 g of oxidative degraded starch (80% by weight) with a COO⁻— substitution grade of 0.03-0.04 and a K-value of 34 (determined after DIN 53726) (Amylex® 15 from Co. Südstärke) and 370.00 g demineralised water were added to the charge and heated up to 80° C. under stirring within 1 h. Then 1.40 g (1% by weight) solution of enzyme Temamyl 120 L were added and the mixture was stirred for 20 min. Afterwards 4.00 g (10% by weight) iron(II) sulfate heptahydrate solution in water was added, whereby the enzymatic degradation was stopped. Subsequently the feed of 70.00 g (5% by weight) hydrogen peroxide solution was started and fed over 165 min. Concomitantly a mixture of 42.00 g of Styrene, 98.00 g of tert-Butyl acrylate, 0.50 g (40% by weight) of Emulsifier K30 (Na—$C_{14}$-$C_{15}$-alkylsulfonate, Emulgator® K30 from Bayer AG) and 110.00 g demineralised water was also fed over 120 min. After the starting of the both feeds the reaction temperature has being risen to 85° C. within 5 min. At the end of the monomer feed 15.00 g demineralised water were added. 15 Min after the completion of hydrogen peroxide feed, 2.00 g (10% by weight) of tert.-Butylhydroperoxide and 1.00 g of a 10% by weight ascorbic acid solution were added and stirred in for 15 min, followed by a new addition of 2.00 g (10% by weight) of tert.-Butylhydroperoxide. The batch was further stirred for 30 min and then cooled down to the room temperature. A finely divided polymer dispersion having a solids content of 25% by weight, a LT value (0.1%) of 73% and a particle size of 73 nm was obtained.

Example 2

Dispersion 3

In a ground-joint 2 l flask equipped with stirrer and internal temperature measurement, 73.62 g of cationic starch Avecat 15 (81.5% by weight), 0.75 g (1% by weight) solution of enzyme Temamyl 120 L) and 370.00 g demineralised water were added to the charge and heated up to 80° C. under stirring within 1 h. Then 7.50 g (1% by weight) solution of enzyme Temamyl 120 L were added and the mixture was stirred for 20 min. Afterwards 4.00 g (10% by weight) iron(II) sulfate heptahydrate solution in water was added, whereby the enzymatic degradation was stopped. Subsequently the feed of 70.00 g (5% by weight) hydrogen peroxide solution was started and fed over 165 min. After the starting of the initiator feed the reaction temperature has being risen up to 85° C. within 5 min and 10 minutes later a mixture of 42.00 g of Styrene, 98.00 g of tert-Butyl acrylate, 1.00 g of Terpinolene (90% by weight), 0.50 g (40% by weight) of Emulsifier K30 (Na—$C_{14}$-$C_{15}$-alkylsulfonate, Emulgator® K30 from Bayer AG) and 110.00 g demineralised water was also started and fed over 120 min. At the end of the monomer feed 15.00 g demineralised water were added. 15 Min after the completion of hydrogen peroxide feed, 2.00 g (10% by weight) of tert.-Butylhydroperoxide and 1.00 g of a 10% by weight ascorbic acid solution were added and stirred in for 15 min, followed by a new addition of 2.00 g (10% by weight) of tert.-Butylhydroperoxide. The batch was further stirred for 30 min and then cooled down to the room temperature. A finely divided polymer dispersion having a solids content of 25.25% by weight, a LT value (0.1%) of 81% and a particle size of 72 nm was obtained.

Comparative Example 2

Dispersion 4

In a ground-joint 2 l flask equipped with stirrer and internal temperature measurement, 73.62 g of cationic starch Avecat 15 (81.5% by weight), 0.75 g (1% by weight) solution of enzyme Temamyl 120 L) and 370.00 g demineralised water were added to the charge and heated up to 80° C. under stirring within 1 h. Then 7.50 g (1% by weight) solution of enzyme Temamyl 120 L were added and the mixture was stirred for 20 min. Afterwards 4.00 g (10% by weight) iron(II) sulfate heptahydrate solution in water was added, whereby the enzymatic degradation was stopped. Subsequently the feed of 70.00 g (5% by weight) hydrogen peroxide solution was started and fed over 165 min. After the starting of the initiator feed the reaction temperature has being risen up to 85° C. within 5 min and 10 minutes later a mixture of 42.00 g of Styrene, 98.00 g of tert-Butyl acrylate, 0.50 g (40% by weight) of Emulsifier K30 (Na—$C_{14}$-$C_{15}$-alkylsulfonate, Emulgator® K30 from Bayer AG) and 110.00 g demineralised water was also started and fed over 120 min. At the end of the monomer feed 15.00 g demineralised water were added. 15 Min after the completion of hydrogen peroxide feed, 2.00 g (10% by weight) of tert.-Butylhydroperoxide and 1.00 g of a 10% by weight ascorbic acid solution were added and stirred in for 15 min, followed by a new addition of 2.00 g (10% by weight) of tert.-Butylhydroperoxide. The batch was further stirred for 30 min and then cooled down to the room temperature. A finely divided polymer dispersion having a solids content of 24.7% by weight, a LT value (0.1%) of 72.3% and a particle size of 82 nm was obtained.

Comparative Example 3

Dispersion 5

In a ground-joint 2 l flask equipped with stirrer and internal temperature measurement, 75.00 g of oxidative degraded starch (80% by weight) with a COO⁻— substitution grade of 0.03-0.04 and a K-value of 34 (determined after DIN 53726) (Amylex® 15 from Co. Südstärke) and 370.00 g demineralised water were added to the charge and heated up to 80° C. under stirring. Then 1.40 g (1% by weight) solution of enzyme Temamyl 120 L were added and the mixture was stirred for 20 min. Afterwards 4.00 g (10% by weight) iron(II)

sulfate heptahydrate solution in water was added, whereby the enzymatic degradation was stopped. Subsequently the feed of 68.00 g (5% by weight) hydrogen peroxide solution was started and fed over 165 min. Concomitantly a mixture of 92.00 g of Styrene, 46.00 g of n-Butyl acrylate, 1.50 g of Acrylic acid, 0.6 g of Terpinolene (90% by weight), 0.50 g (40% by weight) of Emulsifier K30 (Na—$C_{14}$-$C_{15}$-alkylsulfonate, Emulgator® K30 from Bayer AG) and 110.00 g demineralised water was also fed over 120 min. After the starting of the both feeds the reaction temperature has being risen to 85° C. within 5 min. At the end of the monomer feed 15.00 g demineralised water were added. 15 Min after the completion of hydrogen peroxide feed, 2.00 g (10% by weight) of tert.-Butylhydroperoxide were added and stirred in for 30 min and finally was cooled down to the room temperature. A finely divided polymer dispersion having a solids content of 25.3% by weight, a LT value (0.1%) of 79.5% and a particle size of 70 nm was obtained.

Comparative Example 4

Dispersion 6

In a ground-joint 2 l flask equipped with stirrer and internal temperature measurement, 79.55 g of oxidative degraded starch (80% by weight) with a $COO^-$— substitution grade of 0.03-0.04 and a K-value of 34 (determined after DIN 53726) (Amylex® 15 from Co. Südstärke) and 430.00 g demineralised water were added to the charge and heated up to 85° C. under stirring. Then 2.30 g (1% by weight) solution of enzyme Temamyl 120 L and 1.02 g (25% by weight) of Calcium acetate hydrate were added and the mixture was stirred for 30 min. Afterwards 2.6 g (10% by weight) iron(II) sulfate heptahydrate solution in water and 9.22 g of acetic acid were added, whereby the enzymatic degradation was stopped. Subsequently 4.45 g (5% by weight) hydrogen peroxide solution was added in 1 minute and further 40.05 g of the same hydrogen peroxide solution were started and fed over 120 min. Concomitantly a mixture of 84.64 g of Styrene, 42.32 g of tert-Butyl acrylate, 42.32 g of 2-Ethyl-hexyl acrylate, 2.30 g of tert-Dodecylmercaptane, 0.20 g (40% by weight) of Emulsifier K30 (Na—$C_{14}$-$C_{15}$-alkylsulfonate, Emulgator® K30 from Bayer AG) and 124.17 g demineralised water was also fed over 90 min. At the end of the peroxide feed the reaction mixture was stirred further for 30 min and cooled down to 50° C. Then 2.19 g (10% by weight) of tert.-Butylhydroperoxide were added and stirred in for 30 min followed by cooling down to the room temperature. At this temperature 28.94 g (25% by weight) of sodium hydroxide was added over 5 minutes and finally 100 g of demineralised water were added. A polymer dispersion having a solids content of 24.3% by weight, a LT value (0.1%) of 67.2% and a particle size of 72 nm was obtained.

Comparative Example 5

Dispersion 7

In a ground-joint 2 l flask equipped with stirrer and internal temperature measurement, 77.15 g of oxidative degraded starch (80% by weight) with a $COO^-$— substitution grade of 0.03-0.04 and a K-value of 34 (determined after DIN 53726) (Amylex® 15 from Co. Südstärke) and 159.65 g demineralised water were added to the charge and heated up to 85° C. within 45 min under stirring. Then 5.40 g (1% by weight) solution of enzyme Temamyl 120 L and 0.86 g (25% by weight) of Calcium acetate hydrate were added and the mixture was stirred for 30 min. Afterwards 17.10 g (1% by weight) iron(II) sulfate heptahydrate solution in water and 8.57 g of acetic acid were added, whereby the enzymatic degradation was stopped. Subsequently 22.72 g (30% by weight) hydrogen peroxide solution were fed over 30 min and further 5.68 g of the same hydrogen peroxide solution were fed over 75 min. Concomitantly with the peroxide feed a mixture of 105.00 g of Styrene, 45.00 g of n-Butyl acrylate, 2.70 g (40% by weight) of Emulsifier K30 (Na—$C_{14}$-$C_{15}$-alkylsulfonate, Emulgator® K30 from Bayer AG) and 53.57 g demineralised water was also fed over 90 min. At the end of the peroxide feed the reaction mixture cooled down to the room temperature. At this temperature the pH was adjusted with sodium hydroxide to a pH value of 5. A polymer dispersion having a solids content of 32.9% by weight, a LT value (0.1%) of 3.4% and a particle size of 372 nm was obtained.

Example 3

Dispersion 8

In a ground-joint 2 l flask equipped with stirrer and internal temperature measurement, 72.29 g of cationic starch Lyckeby PU-11597 (83% by weight) and 370.00 g demineralised water were added to the charge and heated up to 80° C. under stirring within 1 h. Then 7.70 g (1% by weight) solution of enzyme Temamyl 120 L were added and the mixture was stirred for 20 min. Afterwards 4.00 g (10% by weight) iron(II) sulfate heptahydrate solution in water was added, whereby the enzymatic degradation was stopped. Subsequently the feed of 70.00 g (5% by weight) hydrogen peroxide solution was started and fed over 165 min. After the starting of the initiator feed the reaction temperature has being risen up to 85° C. within 5 min and 10 minutes later a mixture of 42.00 g of Styrene, 98.00 g of tert-Butyl acrylate, 1.00 g of Terpinolene (90% by weight), 0.50 g (40% by weight) of Emulsifier K30 (Na—$C_{14}$-$C_{15}$-alkylsulfonate, Emulgator® K30 from Bayer AG) and 110.00 g demineralised water was also started and fed over 120 min. At the end of the monomer feed 15.00 g demineralised water were added. 15 Min after the completion of hydrogen peroxide feed, 2.00 g (10% by weight) of tert.-Butylhydroperoxide and 1.00 g of a 10% by weight ascorbic acid solution were added and stirred in for 15 min, followed by a new addition of 2.00 g (10% by weight) of tert.-Butylhydroperoxide. The batch was further stirred for 30 min and then cooled down to the room temperature. A finely divided polymer dispersion having a solids content of 24.7% by weight, a LT value (0.1%) of 84.3% and a particle size of 67 nm was obtained.

Example 4

Mixture 1

The dispersion of example 3 (Dispersion 8) was combined with aluminium sulphate at a ratio of 3:1 by weight.

Example 5

Mixture 2

The dispersion of example 1 (Dispersion 1) was combined with aluminium sulphate at a ratio of 3:1 by weight.

Testing of performance characteristics of polymer dispersions obtained according to the examples and the comparative examples An aqueous solution of a degraded corn starch was adjusted to the desired concentration. The dispersions of the examples and comparative example which were to be tested were then metered into the starch solution so that the size press liquor comprised 100 g/l of a degraded corn starch and 1-3 g/l of the respective dispersion. The mixture of starch solution and polymer dispersion was then applied by means of a size press to a paper having a grammage of 80 g/m², which was slightly presized in the pulp with AKD (alkyldiketene), at a temperature of 50° C. The uptake of the preparation was in the region of about 45%. Thereafter, the papers thus treated were dried by means of contact drying at 90° C., conditioned for 24 h at 50% atmospheric humidity and then subjected to the tests.

The test paper used was a paper which was slightly presized in the pulp with AKD and had the following composition: fiber composition (80% of bleached birch sulfate pulp and 20% of bleached pine sulfate pulp) having a filler content of 19% (Hydrocarb® 60ME from Omya)

For determining the degree of sizing of the surface-sized papers, the Cobb value according to DIN EN 20 535 was determined. The water absorbing of the paper sheet in g/m² after contact with water and a contact time of 60 s (or 120 s) is defined as the $Cobb_{60}$ (or $Cobb_{120}$) value. The lower the Cobb value, the better is the sizing effect of the dispersion used.

The results of the tests for the dispersions corresponding to examples 1 and 2 and comparative examples 1 to 5 using amounts 0.5, 0.6 and 0.8 g/l solids respectively are summarised in table 1. The tests for the dispersions corresponding to examples 1 to 5 and comparative example 2 using amounts 0.3, 0.4 and 0.5 g/l respectively were carried out on a different day and the results are summarised in table 2.

TABLE 1

Results of testing of the performance characteristics

| | $Cobb_{60}$ value [g/m²] | | | $Cobb_{120}$ value [g/m²] |
|---|---|---|---|---|
| Amount applied [g/L] | 0.5 | 0.6 | 0.8 | 0.8 |
| Example 1 | 90 | 58 | 30 | 50 |
| Comparative Example 1 | 130 | 126 | 88 | 136 |
| Example 2 | 130 | 116 | 48 | 99 |
| Comparative Example 2 | 129 | 116 | 87 | 137 |
| Comparative Example 3 | 143 | 142 | 130 | 160 |
| Comparative Example 4 | 132 | 120 | 116 | 155 |
| Comparative Example 5 | 160 | 150 | 144 | 166 |

TABLE 2

| | $Cobb_{60}$ value [g/m²] | | | $Cobb_{120}$ value [g/m²] |
|---|---|---|---|---|
| Amount applied [g/L] | 0.3 | 0.4 | 0.5 | 0.5 |
| Example 1 | 92 | 58 | 35 | 61 |
| Comparative Example 2 | 120 | 118 | 99 | 121 |
| Example 3 | 118 | 103 | 75 | 98 |
| Example 4 | 39 | 35 | 31 | 42 |
| Example 5 | 96 | 38 | 33 | 61 |

The results show that overall better sizing effect measured by $Cobb_{60}$ and $Cobb_{120}$ values are achieved by the examples of the invention. Furthermore, from table 2 it can be seen that dispersions containing an aluminium compound exhibit even better sizing.

We claim:

1. A finely divided, starch-containing polymer dispersion obtained by a process comprising: free radical emulsion polymerization of ethylenically unsaturated monomers in the presence of at least one redox initiator and at least one starch, wherein the ethylenically unsaturated monomers comprise:
   (a) 20 to 35% by weight of at least one optionally substituted styrene;
   (b) 65 to 75% by weight of at least one $C_1$-$C_4$-alkyl acrylate; and
   (c) 0 to 5% by weight of at least one other ethylenically unsaturated copolymerizable monomer;
   wherein the sum (a)+(b)+(c) is 100% based on active monomer content and the starch comprises:
   (d) 25 to 35% by weight of at least one degraded anionic starch which has a molar mass $M_w$ of from 2500 to 35 000 g/mol, based on the total weight of solids content of components (a)+(b)+(c)+(d); and
   the polymerization is carried out in the presence of at least one terpene-containing chain-transfer agent of at least 0.01% by weight, based on the monomers used and
   the polymer dispersion may comprise 0.1 to 50% of an aluminium compound based on the total weight of the solids content of the polymer dispersion.

2. The finely divided, starch-containing polymer dispersion of claim 1, wherein the terpene-containing chain-transfer agent is used in an amount of 0.01 to 10% by weight, based on the monomers.

3. The finely divided, starch-containing polymer dispersion of claim 1, wherein the terpene-containing chain-transfer agent is used in an amount of 0.05 to 5% by weight, based on the monomers.

4. The finely divided, starch-containing polymer dispersion of claim 1, wherein the chain-transfer agent is a monocyclic monoterpene; and
   wherein the monocyclic monoterpene is terpinolene.

5. The finely divided, starch-containing polymer dispersion of claim 1, wherein the polymerization is carried out in the presence of 0.05 to 5% by weight of terpinolene as the chain-transfer agent.

6. A process for the preparation of the finely-divided, starch-containing polymer dispersion of claim 1, comprising polymerizing the ethylenically unsaturated monomers in the presence of a redox initiator in an aqueous medium.

7. The process of claim 6, wherein the chain-transfer agent is a monocyclic monoterpene; and
   wherein the monocyclic monoterpene is terpinolene.

8. The process of claim 6, wherein the polymerization is carried out in the presence of from 0.05 to 5% by weight of at least one terpene-containing chain-transfer agent.

9. The process of claim 8, wherein the polymerization is carried out in the presence of from 0.05 to 5% by weight of terpinolene as the chain-transfer agent.

10. The process of claim 6, further comprising:
    adding to the polymer dispersion after polymerization an initiator selected from the group consisting of hydrogen peroxide, peroxides, hydroperoxides and azo initiators; and
    postpolymerizing the polymer dispersion.

11. The process of claim 10, further comprising:
    adding tert-butyl hydroperoxide to the polymer dispersion during postpolymerization.

* * * * *